(12) United States Patent
McCrea et al.

(10) Patent No.: US 12,052,309 B1
(45) Date of Patent: Jul. 30, 2024

(54) APPARATUS AND METHOD FOR A LOW-LATENCY AND SYNCHRONOUS SHARED ONLINE AUDIO SESSION

(71) Applicant: Open Sesame Media, Inc., Marina Del Rey, CA (US)

(72) Inventors: Julian McCrea, Los Angeles, CA (US);
Timothy R. Fox, Tarzana, CA (US);
Douglas Warner, Portland, OR (US);
Stephen Lyons, Newport Beach, CA (US)

(73) Assignee: Open Sesame Media, Inc., Marina Del Rey, CA (US)

( * ) Notice: Subject to any disclaimer, the term of this patent is extended or adjusted under 35 U.S.C. 154(b) by 0 days.

(21) Appl. No.: 17/956,150

(22) Filed: Sep. 29, 2022

Related U.S. Application Data

(60) Provisional application No. 63/250,795, filed on Sep. 30, 2021.

(51) Int. Cl.
| | |
|---|---|
| *H04L 65/75* | (2022.01) |
| *G06F 3/16* | (2006.01) |
| *H04L 1/00* | (2006.01) |
| *H04L 7/00* | (2006.01) |
| *H04L 47/12* | (2022.01) |

(52) U.S. Cl.
CPC ............ *H04L 65/765* (2022.05); *G06F 3/162* (2013.01); *G06F 3/165* (2013.01); *H04L 1/0033* (2013.01); *H04L 7/0016* (2013.01); *H04L 47/12* (2013.01)

(58) Field of Classification Search
CPC ......... G06F 3/162; G06F 3/165; H04L 65/75; H04L 65/752; H04L 65/756; H04L 65/765; H04L 9/40
See application file for complete search history.

(56) References Cited

U.S. PATENT DOCUMENTS

| | | | | |
|---|---|---|---|---|
| 11,625,213 B2 * | 4/2023 | Einziger | ................. | H04L 65/65 709/219 |
| 2005/0190794 A1 * | 9/2005 | Krause | ............. | H04N 21/26216 370/485 |
| 2008/0187282 A1 * | 8/2008 | Brady | ..................... | H04L 65/80 386/E5.07 |
| 2015/0304724 A1 * | 10/2015 | Prosserman | ..... | H04N 21/44008 725/37 |
| 2016/0021149 A1 * | 1/2016 | Maistri | .................... | H04N 7/15 348/14.08 |
| 2017/0078812 A1 * | 3/2017 | Gossain | ................... | G06F 16/60 |
| 2018/0329671 A1 * | 11/2018 | Einziger | ................. | G06F 3/162 |
| 2019/0304477 A1 * | 10/2019 | Wojcieszak | ......... | H04L 45/3065 |
| 2020/0186575 A1 * | 6/2020 | Rofe | ....................... | H04L 43/10 |
| 2020/0314027 A1 * | 10/2020 | Deschenes | ............ | H04L 49/201 |
| 2021/0409888 A1 * | 12/2021 | Schevciw | ............... | H04R 3/00 |
| 2022/0256236 A1 * | 8/2022 | Wolters | .......... | H04N 21/440281 |
| 2023/0216910 A1 * | 7/2023 | Aggarwal | ........ | H04N 21/43076 370/351 |
| 2023/0269155 A1 * | 8/2023 | Van Parys | ........... | H04L 43/0829 370/253 |

\* cited by examiner

*Primary Examiner* — Jonathan A Bui
(74) *Attorney, Agent, or Firm* — COOLEY LLP

(57) ABSTRACT

An apparatus has an audio receiver to receive audio input from client devices. An audio transmitter transmits audio output to the client devices. A synchronicity service evaluates the audio input with respect to a set of network metrics and dynamically adjusts audio communication parameters to insure that the audio output to the client devices has a latency at or below 66 ms.

17 Claims, 3 Drawing Sheets

APPARATUS AND METHOD FOR A LOW-LATENCY AND SYNCHRONOUS SHARED ONLINE AUDIO SESSION

CROSS-REFERENCE TO RELATED APPLICATION

This application claims priority to U.S. Provisional Patent Application No. 63/250,795, filed Sep. 30, 2021, the contents of which are incorporated herein by reference.

FIELD OF THE INVENTION

This invention relates generally to audio communications in computer networks. More particularly, this invention is directed toward a low latency and synchronous shared online audio session.

BACKGROUND OF THE INVENTION

There is a growing interest in having multiple parties at multiple locations interact in some shared experience, such as a musical performance or an online game. The audio associated with such events needs to be synchronized at a level that latency is indistinguishable to the human ear. This typically requires a latency at or below 66 ms, preferably between 8 and 25 ms. This is a challenging problem since the communications are between multiple client devices that communicate using a variety of computer networks.

SUMMARY OF THE INVENTION

An apparatus has an audio receiver to receive audio input from client devices. An audio transmitter transmits audio output to the client devices. A synchronicity service evaluates the audio input with respect to a set of network metrics and dynamically adjusts audio communication parameters to insure that the audio output to the client devices has a latency at or below 66 ms.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
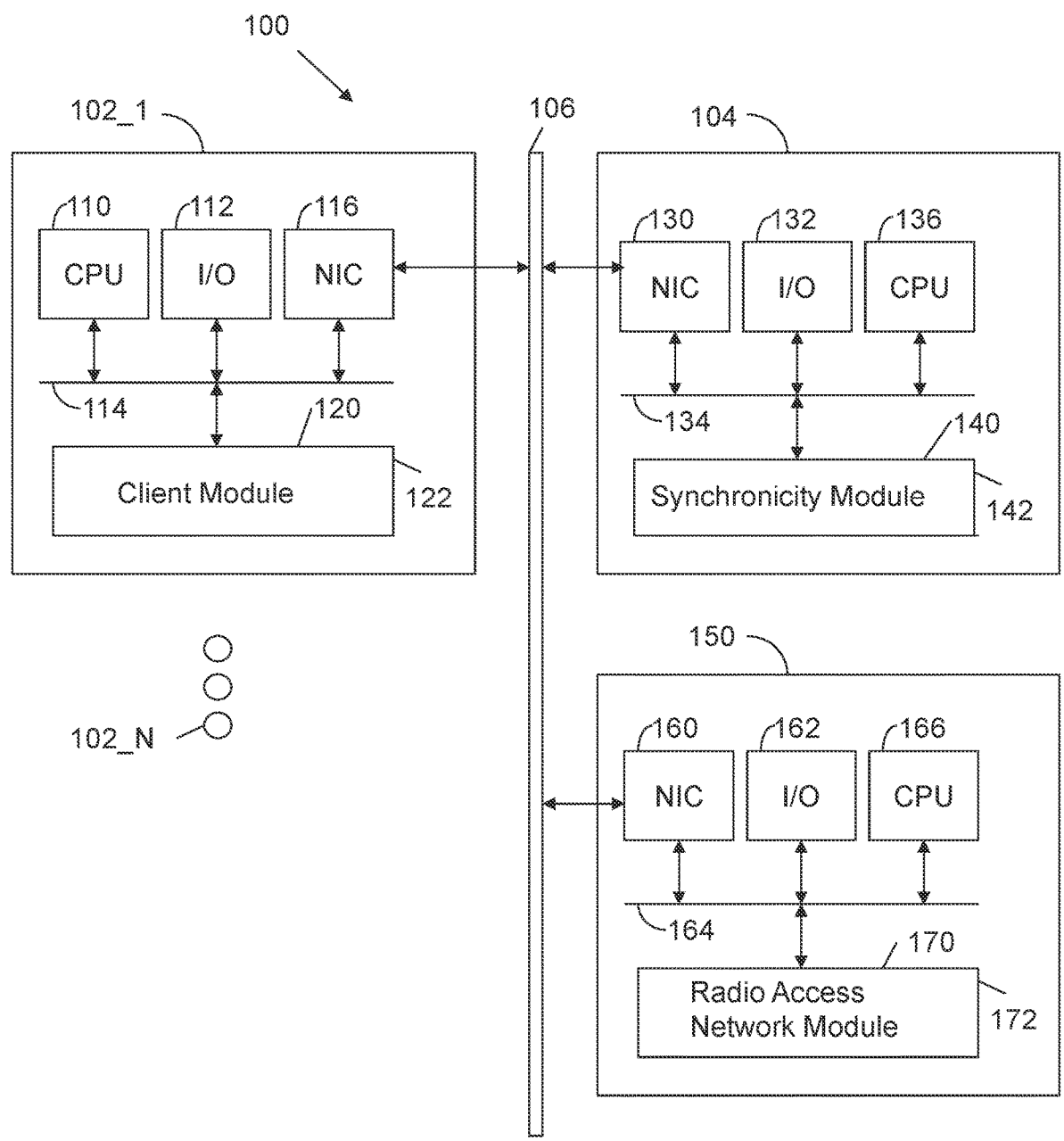
FIG. 1 illustrates a system configured in accordance with an embodiment of the invention.

FIG. 1 illustrates a system 100 configured in accordance with an embodiment of the invention. A set of client devices 102_1 through 102_N share an audio session via a network 106, which may be any combination of wired and wireless networks. The audio session is coordinated by a server 104, which may also interact with a radio access network machine 150.

Each client device 102_1 includes a processor 110 and input/output devices 112 connected via a bus 114. The input/output devices may include a keyboard, mouse, touch display, audio receiver and audio transmitter. A network interface circuit 116 is also connected to the bus 114 to provide connectivity to network 106. A memory 120 is also connected to the bus 114. The memory 120 stores a client module 122 with instructions executed by processor 110 to implement network measurement service operations disclosed herein. The client module 122 connects to server 104 either directly or through Radio Access Network machine 150. The client module 122 processes in-bound and out-bound audio data packets that form audio streams. The client module 122 operates with the synchronicity module 142 to create a low-latency and real-time synchronous audio experience for end users utilizing the client devices 102_1 through 102_N. Each client device enables audio output and input to wireless and wired client devices including but not limited to mobile handsets, audio headphones, gaming consoles, connected televisions and displays, as well as personal computing devices.

Server 104 includes a processor 136, a bus 134, input/output devices 132 and a network interface circuit 130. A memory 140 is connected to the bus 134. The memory stores a synchronicity module 142 with instructions executed by processor 136 to implement synchronicity services disclosed herein. The synchronicity module 142 is a master controller that analyzes, manages, and actuates optimized bi-directional flow of audio data packet streams to and from multiple client devices.

Radio access network machine 150 includes a processor 166, a bus 164, input/output devices 162 and a network interface circuit 160. A memory 170 is connected to bus 164. The memory 170 stores a radio access network module 172 with instructions executed by processor 166 to implement radio access network functions disclosed herein. Machine 150 may be a general-purpose machine, as shown, or it may be implemented as a dedicated semiconductor chip. A radio access network is part of a mobile telecommunication system that resides between a device such as a mobile phone, a computer, or any remotely controlled machine and provides connection with its core network (CN). RAN functionality is typically provided by a silicon chip residing in both the core network as well as the user equipment.

Figure 2:
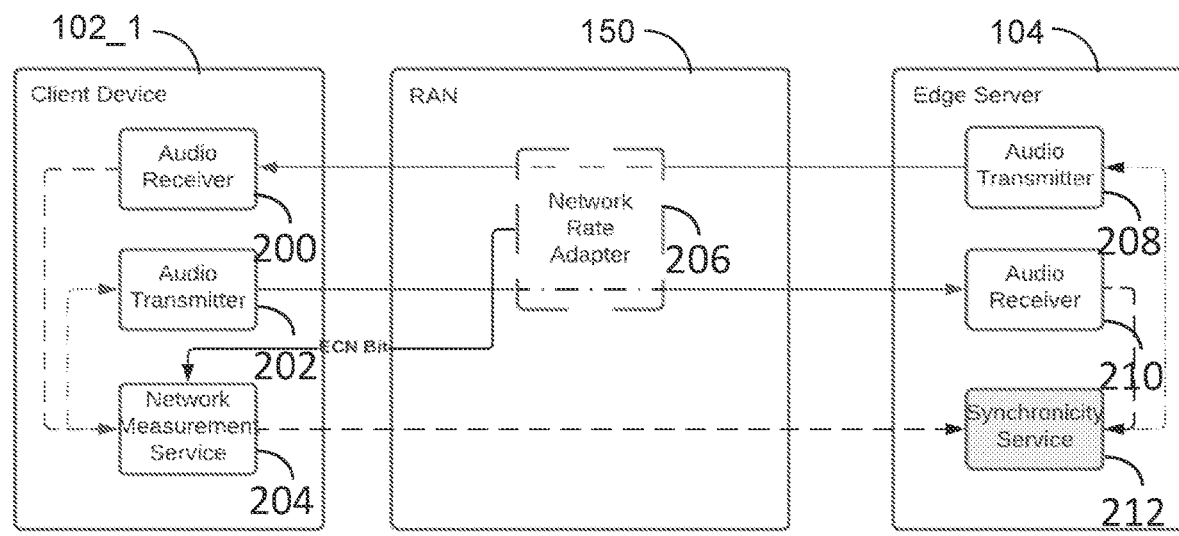
FIG. 2 illustrates a client device interacting with a server through a radio access network.

FIG. 2 illustrates client device 102_1 with an audio receiver 200, an audio transmitter 202 and a network measurement service 204, which may be part of client module 122. The network measurement service 204 reviews the ability of the network to handle the traffic required to keep the inbound audio stream synchronized to other clients. The network measurement service adjusts the outbound audio streams to account for latency and jitter.

The audio receiver 200 receives audio from another device or server. The audio transmitter 202 sends audio to other devices or servers through the RAN 150 and its associated network rate adapter 206. The network rate adapter 206 is a software system running within the hardware of network providers. It manages IP network traffic and applies an Explicit Congestion Notification (ECN) header to packets when the network is congested. ECN bits are a feature in TCP/IP networks that provide congestion notification by marking packets that transit parts of the network experiencing high levels of congestion.

Server 104 has an audio transmitter 208, audio receiver 210 and a synchronicity service 212, which may be implemented with the synchronicity module 142. The synchronicity service 212 operates with the network measurement service 204 to implement an adaptive bitrate. The adaptive bit rate delivers audio files to client devices in the most efficient way possible and at the highest usable quality for each specific client.

Server 104 may be an edge server. Edge computing in telecom, often referred to as Mobile Edge Computing, MEC, or Multi-Access Edge Computing, provides execution resources (compute and storage) for applications with networking close to the end users, typically within or at the boundary of operator networks. The edge infrastructure can be managed or hosted by communication service providers or other types of service providers. The main benefits edge solutions provide include low latency, high bandwidth, device processing and data offload as well as trusted computing and storage.

The network measurement service 204 takes input from the audio receiver 200 and ECN bits to report back a level of congestion and synchronicity to the synchronicity service 212. Synchronicity refers to the ability to keep all audio streams on a constant timeline and to minimize latency for each party participating in a multi-party audio event.

Figure 3:
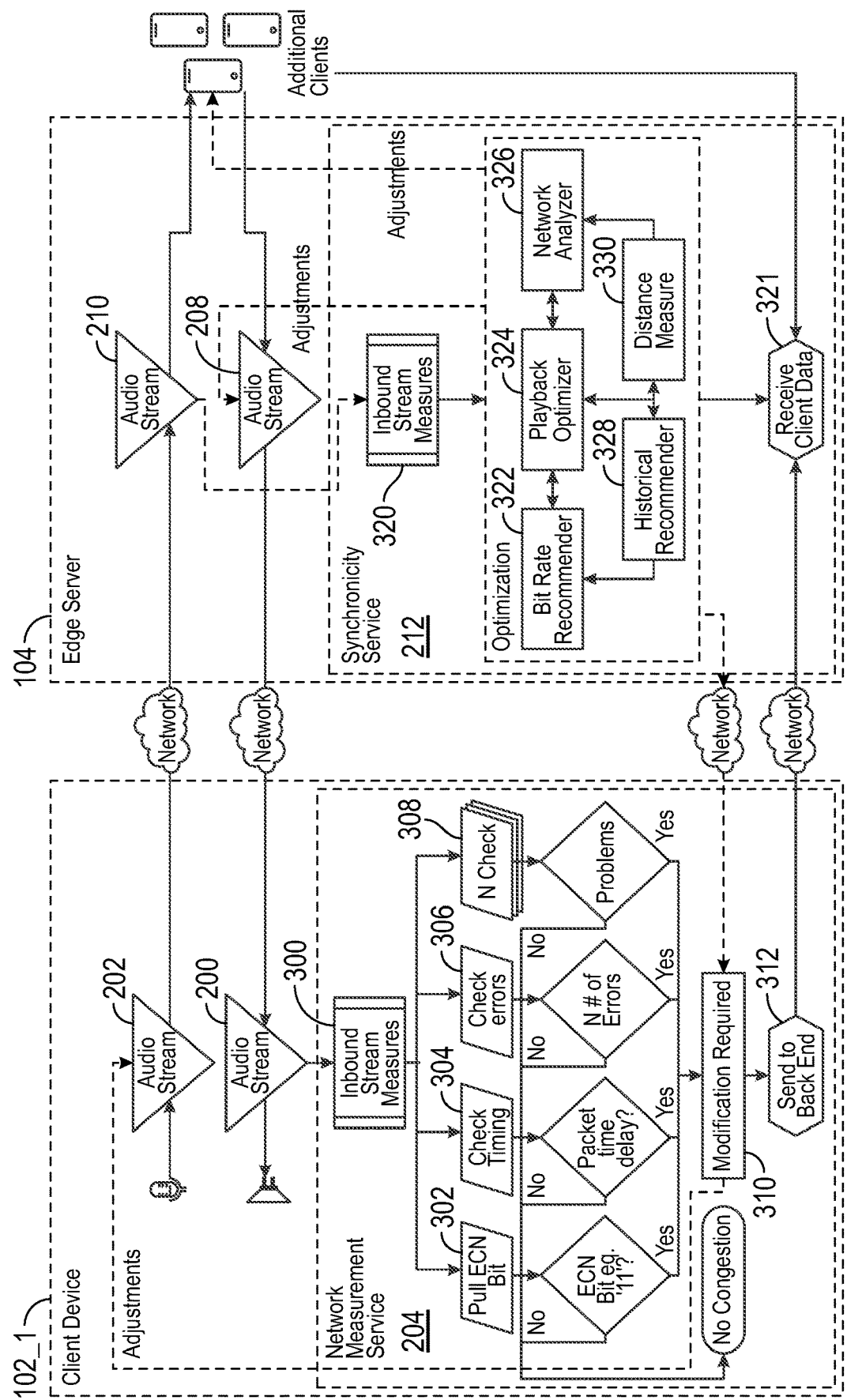
FIG. 3 illustrates processing operations performed by a client device and server in accordance with an embodiment of the invention.

FIG. 3 illustrates processing operations performed by client device 102_1 and server 104. The network measurement service 204 collects inbound stream measures 300 from audio receiver 200. More particularly, the network measurement service 204 collects specific information about network packets and information contained in the streams coming from the server 104. This will be the focal point for how the audio streams are measured, on the network layer. This uses either the outbound stream or the inbound stream to decide on what it should measure with the underlaying checks.

One specific measure are ECN bits 302. The ECN bits associated with the inbound traffic from the RAN network indicate congestion. This results in input to the modifications module 310. If the ECN bit is "1" then it can assume that there is congestion on the network. The usual state will be "0" showing that there is no congestion that the RAN is reporting.

Another measure is to check timing 304. That is, the network measurement service 204 reviews the amount of time between individual packets received to evaluate if there is a measurable variance that indicates congestion. If the time has a high amount of variation, this indicates that there could be instability in the network. The modification module 310 is directed to make modifications to reduce the time variation. This can be adjusting the packet rate, increasing the size of the packet, increase the time between packets or adjust to other codecs or protocols, such as switching from TCP to UDP or vice versa.

Errors are also checked 306. That is, there is a review of duplicate or out of order packets indicative of congestion in the network. The review can note specifics about network errors that are reported at the transport layer and are indicative of a problem or congestion on the network. If there is an increase in error rates, the modification module 310 may alter protocols (TCP vs UDP) or codec methods.

Other checks 308 may also be evaluated. Such additional checks may include evaluating latency to determine any variance in the performance of the network that indicates that there is network congestion. Any method that can be gleaned from the packets, including encryption time or packet degradation, can be checked here to help determine if there are problems causing a reduction in network efficiency, synchronicity or in network improvement.

The modification module 310 collects the inputs from the various checks 302, 304, 306 and 308 and decides if an adjustment needs to be made. It will determine, based on the type of problem to then adjust in a way that will best solve the problem. There are multiple choices it can make: adjust the bit rate, adjust the speed, adjust the timing, adjusting the codec, adjusting the protocol, adjust which endpoint is used and/or other network adjustments. If it finds that there is congestion via the ECN bit, it may reduce the bit rate, to have it use smaller packets. If the timing is off, it may adjust the speed (slower) to better allow synchronicity, this may also need a codec update at the same time, to ensure the best quality at a slower speed. It may determine that the number of hops to the server is high and may send information on which endpoints are closer. The modifications are sent to audio transmitter 202 and to the backend 312. This allows the synchronicity service 212 to make recommendations and/or adjustments to the outbound streams for both the server 104 and other clients.

The modification module 310 also takes input from the synchronicity service 212 to tune and/or make further adjustments. This includes adjustments that the server 104 determines that the client 102_1 needs to make to have better synchronicity. This could be telling the client to use a different endpoint, or due to another client limitation, change the codec.

The modification module 310 may alter security settings. For example, it may establish specific requirements for encryption and security that may affect the overall performance of the client and audio stream. This can be user specific, so it will defer to the user side to understand what it needs to do, which could be encrypting all data, or just the meta data, leaving the audio stream unencrypted.

The synchronicity service 212 reviews the ability of the network to handle the traffic required to keep all clients synchronized. It dynamically adjusts the outbound audio streams at audio transmitter 208. Additionally, it accounts for latency and provides direction to the network measurement service 204 on which adjustments should be made. It tracks adjustments for future analysis and optimization. The service 212 also considers any client-side adjustments that are made to allow it to optimize across all clients.

Inbound stream measures 320 are collected from audio receiver 210. The inbound stream measures include information about network packets and information contained in the streams coming from the client devices 102_1 through 102_N. This will be the focal point for how the audio streams are measured on the network layer. This uses either the outbound stream or the inbound stream to decide on what it should measure with the different checks.

Client data is received 321. This data has information about adjustments and/or measures from the network measurement service 204. This is an aggregation of any information that the client is sending on what it feels needs to be adjusted for the best synchronicity. This takes in input from all the clients 102_1 through 102_N.

A bit rate recommender 322 makes specific bit rate adjustments that outbound stream systems can make to optimize the throughput on the given network for a given client to maintain synchronicity. It could recommend based on the needs of a single client, to adjust down the bit rate across all clients to allow that one client to stay in synchronicity. It may also decide to up the bit rate to take advantage of better network performance.

A playback optimizer 324 makes specific playback changes that adjust the speed of playback for the outbound stream systems to optimize the throughput on the given network for a given client to maintain synchronous audio streams for a multi-party event. For example, if it finds that the ECN bit is set on a specific client network, it may decide that it should slow down playback slightly on other clients to keep them in sync.

A network analyzer 326 takes information from the clients and recommends changes, based on network packets, to optimize throughput on the given network, enabling a given client to maintain synchronous audio streams for a multi-party event. This is looking at all information, from both clients and server, to determine how it should make changes. If one client is having a jitter problem, it will decide not to make a change that would be detrimental to the other clients. It maximizes how to optimize the network. It may evaluate the specific number of network hops to a client to determine optimal network location. In reviewing the hops between all clients and the server, it may recommend that they all switch to a different endpoint that would be closer to all clients.

The historical recommender 328 tracks previous adjustments for quicker recommendations. This looks at time of day, hour of day, day of the week, to determine if it can anticipate that there are potential network problems. The historical data will rate the timeframe to determine if alterations should be preemptively made, knowing that network congestion is imminent.

The distance measure module 330 uses distance from client to server to make recommendations on adjustments to optimize the throughput on the given network to maintain synchronicity. A different location for server 104 may be used to yield a lower latency connection. Each client will be a specific distance, network hops, from the server and evaluating the smaller number of hops, means there is potentially less network latency. The distance measure module 330 tries to keep the number of hops at the smallest possible number.

The synchronicity service 212 may also collect specific requirements for encryption and security that may affect the overall performance of the client and audio stream. This considers the minimum requirements from all clients and applies them to all streams. If a client has a requirement for full encryption, then all streams would be encrypted. This will impact latency, so a recommendation on codecs and bit rates that would be better suited to encryption apply.

The synchronicity service 212 optimizes the paths audio streams take to and from each participating party by balancing and organizing the synchronous delivery of audio packets to participating parties on the client devices. The service 212 ranks and indexes client devices (from analysis of previous audio streams (BPM) beats-per-minute data and pitch data) to determine if the client devices grouped together deliver an optimal synchronous audio experience for each party.

It can be appreciated that the disclosed technology can be used for a multi-location, multi-party live music performance. Two or more people, each in a different location and/or operating through different client devices, perform in a live music performance, and utilize the technology to receive and deliver their singing and/or musical instrument play in real-time with no perceived latency (i.e., a latency at or below 66 ms) to other participating people, including both the performers as well as the listening audience.

Similarly, the disclosed technology can be used for multi-location, multi-party live karaoke on mobile devices. Two or more people engage in a live karaoke experience while in different locations, by utilizing a mobile application which utilizes the disclosed technology to enable the people to sing together in real-time with no perceived latency.

The disclosed technology may also be used for multi-location, multi-party online video gaming. Two or more people engaged in a multiplayer online video game, utilizing the disclosed technology verbally communicate in real-time with no perceived latency. This transforms their multiplayer gaming experience and gives them a timing edge.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
   an audio receiver to receive from a network audio input from client devices;
   an audio transmitter to transmit to the network audio output to the client devices; and
   a synchronicity service to evaluate the ability of the network to handle the traffic required to keep all of the client devices synchronized by evaluating the audio input with respect to a set of network metrics and dynamically adjusting audio communication parameters to insure that the audio output to the client devices has a latency at or below 66 ms, wherein the synchronicity service is a master controller that analyzes, manages, and actuates optimized bi-directional flow of audio data packet streams to and from the client devices by dynamically adjusting packet parameters and the audio communication parameters to alter network traffic to keep all of the client devices synchronized.

2. The apparatus of claim 1 wherein the network metrics include bit rate and the audio communication parameters are dynamically adjusted to alter bit rate of the audio output.

3. The apparatus of claim 1 wherein the network metrics include playback parameters and the audio communication parameters are dynamically adjusted to alter audio playback speed.

4. The apparatus of claim 1 wherein the network metrics include historical network traffic information and the audio communication parameters are dynamically adjusted in accordance with the historical network traffic information.

5. The apparatus of claim 1 wherein the network metrics include distance measures between networked devices and the audio communication parameters are dynamically adjusted to alter distances between networked devices.

6. The apparatus of claim 1 in combination with a selected client device operating a network measurement service to evaluate a selected audio input with respect to a selected set of network metrics and dynamically adjust a transmitted audio signal.

7. The apparatus of claim 6 wherein the selected set of network metrics include network congestion bits and the transmitted audio signal is dynamically adjusted in response to network congestion conditions.

8. The apparatus of claim 6 wherein the selected set of network metrics includes timing information and the transmitted audio signal timing is dynamically adjusted.

9. The apparatus of claim 6 wherein the selected set of network metrics includes network error information and the transmitted audio signal is dynamically adjusted to reduce network errors.

10. The apparatus of claim 6 further comprising communicating the transmitted audio signal information to the synchronicity service.

11. The apparatus of claim 6 wherein the transmitted audio signal is dynamically adjusted to alter bit rate.

12. The apparatus of claim 6 wherein the transmitted audio signal is dynamically adjusted to alter audio signal speed.

13. The apparatus of claim 6 wherein the transmitted audio signal is dynamically adjusted to alter audio signal timing.

14. The apparatus of claim 6 wherein the transmitted audio signal is sent to a different codec.

15. The apparatus of claim 6 wherein the transmitted audio signal utilizes a different network protocol.

16. The apparatus of claim 6 wherein the transmitted audio signal utilizes a different network endpoint.

17. An apparatus, comprising:
- an audio receiver to receive from a network audio input from client devices;
- an audio transmitter to transmit to the network audio output to the client devices; and
- a synchronicity service to evaluate the ability of the network to handle the traffic required to keep all of the client devices synchronized by evaluating the audio input with respect to a set of network metrics and dynamically adjusting audio communication parameters to insure that the audio output to the client devices has a latency at or below 66 ms, wherein the synchronicity service is a master controller with a bit rate recommender, playback optimizer, network analyzer, historical recommender and distance measure to client devices.

* * * * *